(12) United States Patent
Wiggins

(10) Patent No.: US 6,547,062 B2
(45) Date of Patent: Apr. 15, 2003

(54) CLAMPING SYSTEM FOR A SEALING ELEMENT ON A CONVEYOR SYSTEM, AND A METHOD OF MAINTAINING A SEALING ELEMENT ON A CONVEYOR SYSTEM

(75) Inventor: Daniel Wiggins, Marquette, MI (US)

(73) Assignee: Argonics, Inc., Marquette, MI (US)

( * ) Notice: Subject to any disclaimer, the term of this patent is extended or adjusted under 35 U.S.C. 154(b) by 0 days.

(21) Appl. No.: 09/851,305

(22) Filed: May 8, 2001

(65) Prior Publication Data

US 2002/0175050 A1 Nov. 28, 2002

(51) Int. Cl.$^7$ ............................................... B65G 21/20
(52) U.S. Cl. .................................................... 198/836.1
(58) Field of Search ............................... 198/525, 836.1

(56) References Cited

U.S. PATENT DOCUMENTS

| | | | |
|---|---|---|---|
| 4,231,471 A | 11/1980 | Gordon | |
| 4,436,446 A | 3/1984 | Gordon | |
| 4,877,125 A | 10/1989 | Gordon | |
| 4,989,727 A | 2/1991 | Gordon | |
| 5,048,669 A | 9/1991 | Swinderman | |
| 5,154,280 A | 10/1992 | Mott | |
| 5,267,642 A | 12/1993 | Gharpurey et al. | |
| 5,350,053 A | 9/1994 | Archer | |
| 5,725,083 A | 3/1998 | Archer | |
| 5,774,951 A | * 7/1998 | Close et al. ............. | 198/836.1 |
| 5,927,478 A | 7/1999 | Archer | |

OTHER PUBLICATIONS

Publication Name and Date Unknown—pp. 306–313.
Argonics Snapo–Loc™ Catalog Page.
Flexco "Flex–Lok™ Conveyor Skirt" Product Description.
Classic Scraper Corporation "Classic Skirtboard/Seal Systems" Product Description.
Scorpio Conveyor Products "LOC–BLOC Skirt System" Product Description.
Brelko "Keyskirt Size 3 and Size 4" Product Description.
Martin Engineering "Trac–Mount® Skirtboard Sealing System" Catalog Pages (5).
Arch Environmental Equipment Inc. "Flexiskirt® Skirt Seal System"—Product Description.
Conveyor Components Company "Conveyor Belt Skirtboard Clamp"—Product Description.
Asgco "Clamp–mount™ System"—Product Description.

* cited by examiner

Primary Examiner—Joseph E Valenza
(74) Attorney, Agent, or Firm—Wood, Phillips, Katz, Clark & Mortimer

(57) ABSTRACT

The combination of a conveying surface that is movable to advance material supported thereon, a wall projecting upwardly from the conveying surface to confine material on the conveying surface, a sealing element to block passage of material between the conveyor surface and wall, and a clamping system for the sealing element. The clamping system may consist of a) a locking assembly having a bearing portion that is mounted for movement relative to the wall between i) a mounting position and ii) a holding position, with the sealing element residing between the wall and the bearing portion with the locking element in the holding position, b) a fixing element on the wall, and c) a wedge assembly having a body that cooperates with the fixing element and that is movable slidably and guidingly relative to the locking assembly between first and second positions. The wedge assembly in the second position urges the bearing portion of the locking assembly toward the sealing element with a force that is greater than a force with which the wedge assembly urges the bearing portion of the locking assembly toward the sealing element with the wedge assembly in the first position.

39 Claims, 5 Drawing Sheets

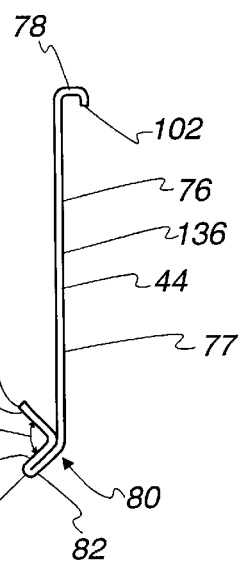
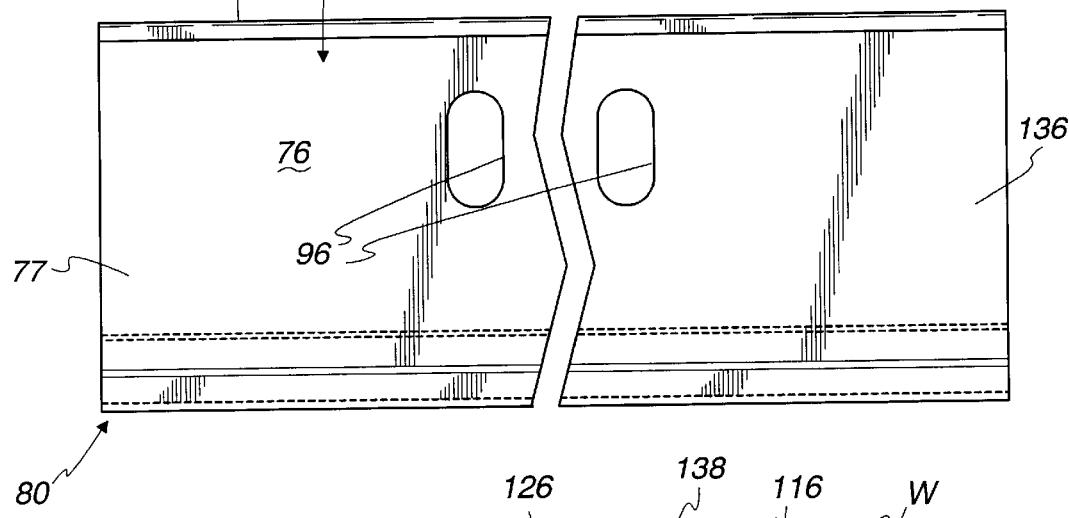
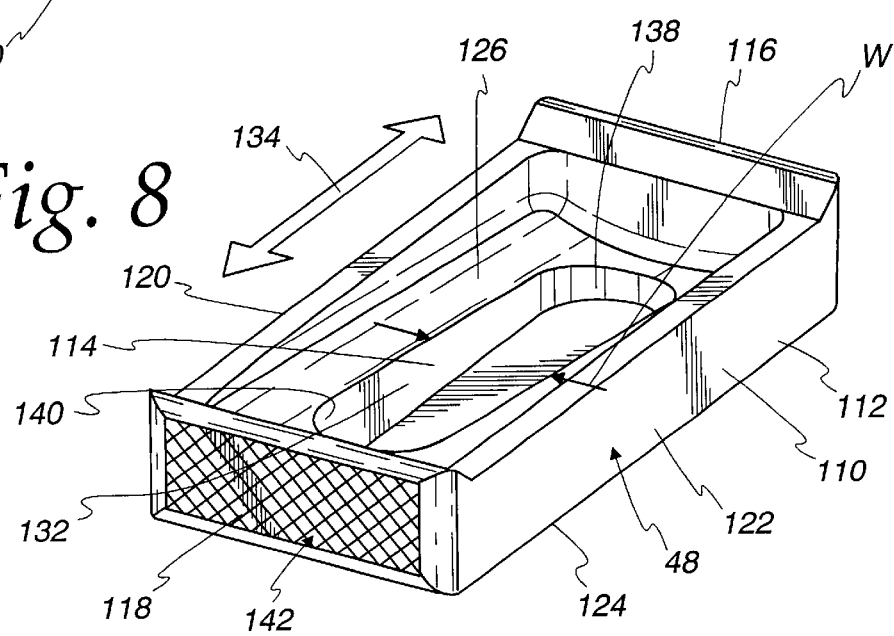

CLAMPING SYSTEM FOR A SEALING ELEMENT ON A CONVEYOR SYSTEM, AND A METHOD OF MAINTAINING A SEALING ELEMENT ON A CONVEYOR SYSTEM

BACKGROUND OF THE INVENTION

1. Field of the Invention

This invention relates to conveyors of the type having a surface that is movable to advance material supported thereon and a wall projecting upwardly from the conveyor surface to confine material on the conveyor surface and, more particularly, to a clamping system for a sealing element used to block passage of material between the conveyor surface and wall. The invention is also directed to a method of maintaining a sealing element on such a conveyor system.

2. Background Art

A wide range of conveyor systems are currently being used which have a belt or other conveyor surface that is movable to advance material supported thereon. At a loading location, material to be conveyed is commonly transferred by being dropped or otherwise placed onto the conveyor surface. This tends to cause some of the material to escape from the edges of the conveyor belt and onto the surrounding support surface for the conveyor system, potentially creating an unsafe work area and/or one that is environmentally detrimental To alleviate this problem, it is known to install upwardly extending containment walls which project upwardly from the conveyor surface. To avoid the escape of material from the conveyor surface by migration between the containment walls and conveyor surface, it is known to use a flexible sealing element, commonly referred to in the industry as a "skirt board", "skirting", or "skirt board rubber". The sealing element is typically in contact with the running conveyor surface. As a result, there is progressive wear on the bottom edge of the sealing element which eventually leads to the formation of a gap through which conveying material may escape.

To alleviate this problem, the sealing element may be adjusted vertically downward to diminish or eliminate this gap. To facilitate this adjustment, commonly the sealing element is maintained in its operative position by a clamping arrangement which can be selectively tightened to maintain the sealing element in the operative position and released to allow vertical repositioning of the sealing element. These clamping arrangements have taken a wide range of different forms in the past.

The sealing elements on each side of a conveyor belt typically run anywhere from five feet to one hundred feet in length. The process required to make the adjustment after wear occurs may take anywhere from five minutes, to hours, to potentially days, depending upon the length and number of conveyors being run at a particular facility. Consequently, it is an objective of designers of clamping systems for sealing elements in these environments to facilitate quick and easy adjustment of the sealing element. At the same time, this convenience should not be afforded at the expense of functionality. Ideally, the clamping system should be designed to withstand sometimes very harsh and severe environments and continued use for long periods of time. Further, the designers of such systems must remain mindful of cost of manufacture and ease of installation.

SUMMARY OF THE INVENTION

In one form, the invention is directed to the combination of a conveying surface that is movable to advance material supported thereon, a wall projecting upwardly from the conveying surface to confine material on the conveying surface, sealing element to block passage of material between the conveying surface and wall, and a clamping system for the sealing element. The clamping system may consist of a) a locking assembly having a bearing portion that is mounted for movement relative to the wall between i) a mounting position and ii) a holding position, with the sealing element residing between the wall and the bearing portion, with the locking element in the holding position, b) a fixing element on the wall, and c) a wedge assembly having a body that cooperates with the fixing element and that is movable slidably and guidingly relative to the locking assembly between first and second positions. The wedge assembly in the second position urges the bearing portion of the locking assembly toward the sealing element with a force that is greater than a force with which the wedge assembly urges the bearing portion of the locking assembly toward the sealing element with the wedge assembly in the first position.

The body may be movable translatingly in a line as the wedge assembly is changed between the first and second positions.

The clamping system may further include a base assembly that is attached to the wall, with the locking assembly being attached to the wall through the base assembly.

The locking assembly may be pivotable relative to the base assembly for movement between the mounting and holding positions.

In one form, the locking assembly and base assembly each have a C-shaped edge, and the C-shaped edges interengage to guide pivoting movement between the locking assembly and base assembly.

The C-shaped edges may be engageable and disengageable by relatively moving the locking assembly and base assembly.

In one form, the fixing element consists of a bolt with a head, and the bolt head is captively held against the wall by the base assembly.

In one form, the bearing portion of the locking assembly consists of a V-shaped element with free edges which simultaneously bear against the sealing element with the locking assembly in the holding position.

In one form, the body of the wedge assembly consists of an elongate slot through which the fixing element extends and a cam surface. The fixing element has a shank which extends through the elongate slot and an enlargement on the shank which is guided against the cam surface as the wedge assembly is changed between the first and second positions.

The shank may be threaded, with the enlargement being defined by a nut which is threaded to the shank.

The nut may have a convex surface which is guided against the cam surface.

The sealing element may be clamped directly between a part of the base assembly and the bearing portion of the locking assembly.

The locking assembly and base assembly may each be made from a formed metal sheet.

The body may be movable directly against and relative to the lock assembly.

The invention is also directed to a clamping assembly for a sealing element, as described above.

The invention is further directed to a method of maintaining a sealing element in an operative position on a conveyor system having a conveying surface that is movable to advance material supported thereon and a wall projecting upwardly from the conveying surface to confine material on the conveying surface so as to block passage of material between the conveying surface and wall. The method includes the steps of attaching a locking assembly to the wall for movement relative to the wall between a mounting position and a holding position, connecting a body to a fixing element on the wall, and sliding the body guidingly relative to the fixing element from a first position into a second position and thereby camming a portion of the locking assembly against the sealing element with the sealing element in the operative position.

The fixing element may have a shank and an enlargement on the shank. The body moves guidingly against the enlargement on the shank as the body is moved from the first position into the second position.

The body may move in a substantially straight line between the first and second positions.

The method may further include the step of moving the body from the second position into the first position, and thereafter repositioning the sealing element relative to the wall and moving the body from the first position into the second position.

The step of sliding the body may involve moving the body by striking the body with an object, such as a hammer.

The method may further include the step of attaching a base assembly to the wall. The step of attaching the locking assembly to the wall may involve attaching the locking assembly to the base assembly.

The step of attaching the locking assembly to the base assembly may involve engaging the locking assembly to the base assembly for pivoting movement of the locking assembly relative to the base assembly.

The step of attaching the locking assembly to the base assembly may involve interengaging C-shaped edges on the locking assembly and base assembly.

The method may further include the step of captively holding the fixing element relative to the wall through the base assembly.

BRIEF DESCRIPTION OF THE DRAWINGS

FIG. 6 is an end elevation view of a locking assembly which is attached removably to the base assembly to maintain the sealing element in the operative position;

FIG. 7 is a side elevation view of the locking assembly of FIG. 6;

FIG. 8 is an enlarged, perspective view of a body on a wedge assembly used to maintain the locking assembly biasably against the sealing element in the operative position;

DETAILED DESCRIPTION OF THE DRAWINGS

Figure 1:
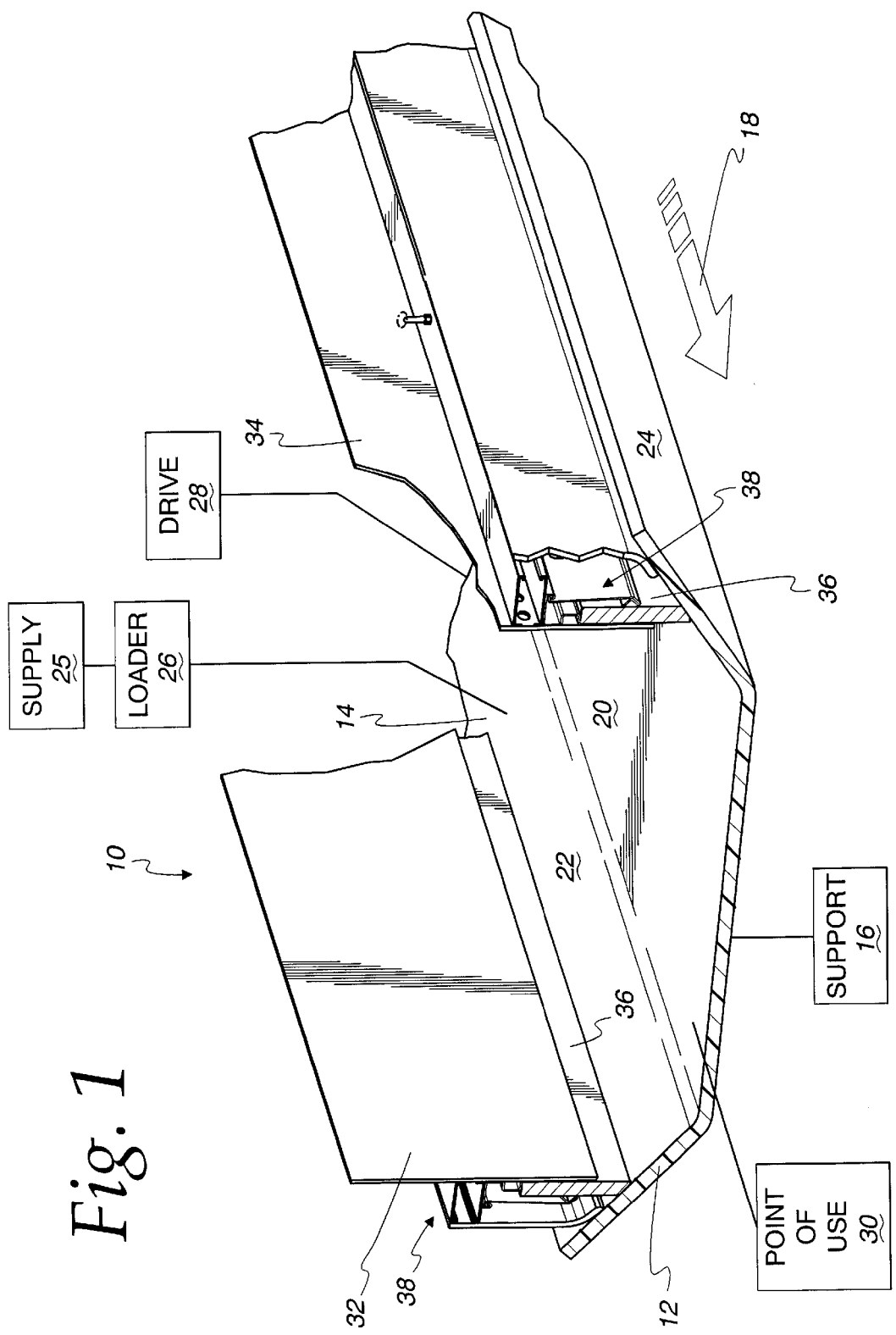
FIG. 1 is a fragmentary, perspective view of a conveyor system including a movable conveyor surface having side containment walls with a sealing element attached to the walls using a clamping system, according to the present invention.

In FIG. 1, a typical conveyor system for material such as bulk aggregate is shown at 10. The material conveyed may be in particulate form or may be a composite material, such as gravel, coal, or the like. The nature of the material being conveyed is not critical to the present invention, as virtually any type of discreet object or material, that can be conveyed between two locations through a supporting surface, is contemplated by the invention.

The conveyor system 10 consists of a belt 12 defining an upwardly facing conveying surface 14. The belt 12 is mounted on a support 16 for movement in a predetermined path, as indicated by the directional arrow 18. In this particular embodiment, the belt 12 consists of a horizontal center section 20 with angled side portions 22,24, contiguous therewith and, in conjunction therewith, defining a generally U-shaped receptacle for material to be conveyed. This belt configuration is only exemplary, as the invention could be used with other belt designs, including a simple flat belt.

The material to be conveyed is deposited on the conveyor surface 14 by any suitable means. The material might be manually introduced by hand or funneled from a bulk supply 25, as through a loader 26. The material deposited on the conveyor surface 14 is advanced by movement of the conveyor surface 14, which is effected through an appropriate drive 28. The conveyed material upon the conveyor surface 14 may be delivered to any appropriate point of use, indicated schematically at 30 in FIG. 1.

To confine material introduced to the conveying surface 14, particularly at the point of loading, laterally spaced containment walls 32,34 are mounted to project upwardly from the belt side portions 22,24. To prevent migration of material between the side portions 22,24 and the containment walls 32,34 at the bottom of the side portions 22,24, a sealing element 36 is employed and held in place by a clamping system at 38, according to the present invention, at each wall 32,34.

The details of the clamping system can be seen in FIGS. 2–13, in conjunction with FIG. 1. The clamping system 38 will be described in connection with the exemplary sealing element 36 mounted to the wall 34 over the belt side portion 24.

The containment wall 34 has a vertically extending and laterally facing side surface 40 against which the sealing element 36 abuts and to which the clamping system 38 is attached. The clamping system 38 consists of a base assembly 42, a locking assembly 44, a series of fixing elements 46, and a series of wedge assemblies 48.

Figure 3:
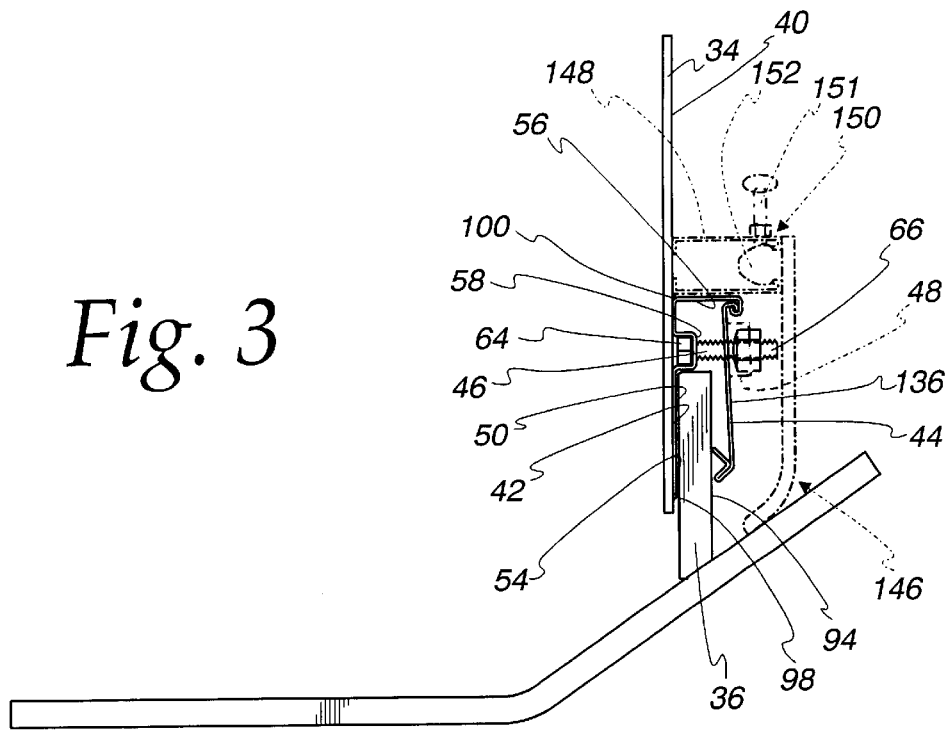
FIG. 3 is a fragmentary, end elevation view of the structure shown in FIG. 2.
Figure 4:
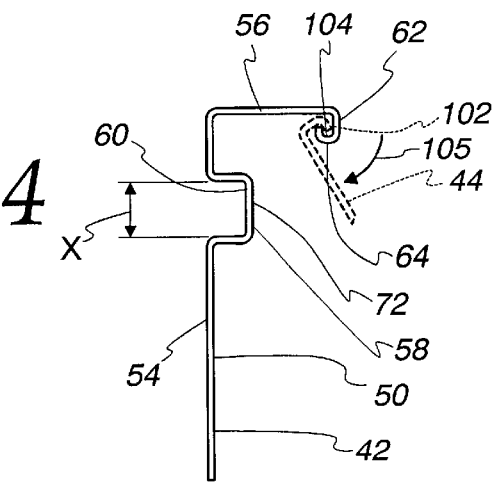
FIG. 4 is an enlarged, end elevation view of a base assembly on the inventive clamping system, which is attached to the containment wall.
Figure 5:
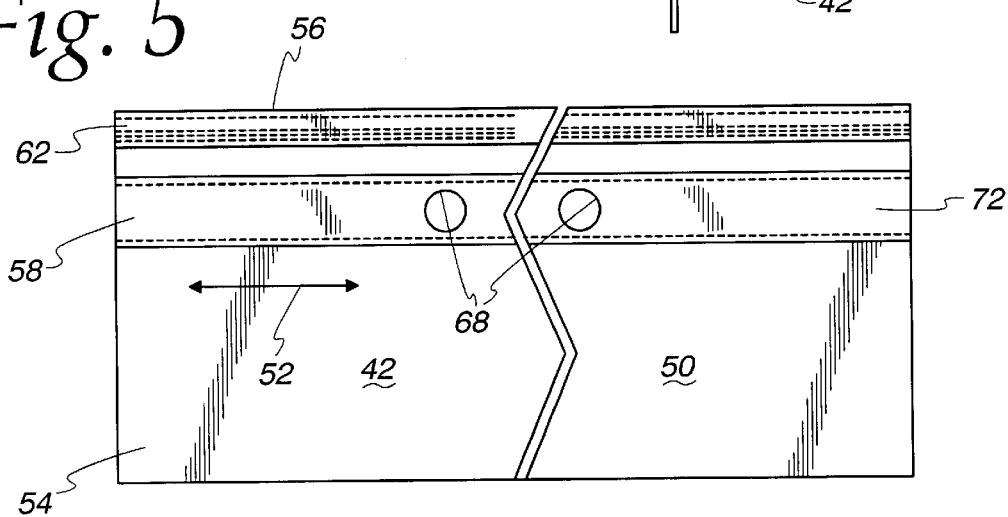
FIG. 5 is a side elevation view of the base assembly in FIG. 4.
Figure 9:
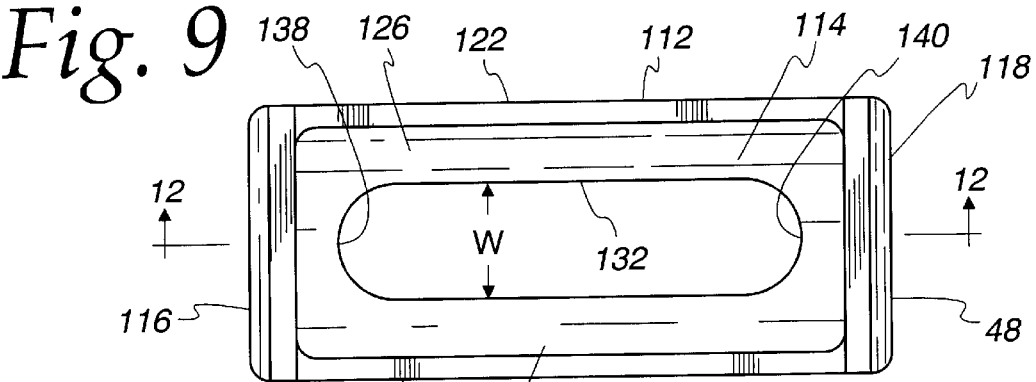
FIG. 9 is a plan view of the wedge assembly body of FIG. 8.

The base assembly 42, as seen clearly in FIGS. 3–5, is a formed sheet 50, which is preferably metal. A 12 gauge galvanized sheet may perform suitably in most environments. The sheet 50 may be formed to have a uniform cross-sectional configuration throughout its length, as indicated by the double-headed arrow 52. The sheet 50 is generally L-shaped with a vertical leg 54 and a horizontal leg 56. The vertical leg 54 is formed to define a squared projection 58, which defines a receptacle 60 for a part of each of the fixing elements 46, as hereafter described.

The horizontal leg 56 has a depending lip 62 which terminates at an upwardly opening C-shaped edge 64.

The vertical dimension X of the receptacle 60 is selected to receive an enlarged head 64 on each fixing element 46. In the embodiment shown, each fixing element 46 is in the form of a bolt with a threaded shank 66 projecting from the head 64. The head 64 has a conventional, polygonal outer surface with parallel surface portions which nest in the receptacle so that the head 64 is keyed against rotation within the receptacle 60. Openings 68 are provided through a vertically extending, offset wall portion 72, which bounds the receptacle 60, to allow passage therethrough of the shanks 66. The openings 68 may be spaced on five inch centers or any other suitable distance as the application dictates.

As seen most clearly in FIGS. 1, 6 and 7, the locking assembly, shown at 44, is likewise formed from a sheet 76, which may also be 12 gauge galvanized sheet, or other gauge and composition as the particular application dictates. The base and locking assemblies 42,44 can be provided in virtually any length. A suitable length may be on the order of five feet for purposes of ease of handling and shipping. The sheet 76 has a vertical wall 77 that terminates at an inverted C-shaped edge 78 at its upper end and a bearing portion 80, at its lower end. The bearing portion 80 is defined by bending the sheet 76 to define an angled edge 82, return bending the sheet 76 to define a portion 84 that bears flushly against the edge 82, and outwardly bending the sheet 76 from the section 84 to define a cantilevered portion 86. The section 84 and cantilevered portion 86 define an included angle θ of approximately 90°. A free edge 88 of the cantilevered portion 86, and an edge 90 at the bight between the portion 84 and edge 82 are situated to cooperatively bear against an outwardly facing surface 94 on the sealing element 36. Openings 96 are formed through the sheet 76 at intervals corresponding to the location of the openings 68 in the base assembly 42. The openings 96 are elliptical in shape, with elongation in the vertical direction, for reasons described hereinafter.

Roll forming of the base and locking assemblies 42,44 potentially accounts for economical production of parts. The continuous extension of the base and locking assemblies 42,44 promotes structural continuity between the belts 12 and sealing element 36. Using galvanized material for the base and locking assemblies 42,44 generally results in little corrosion.

The clamping system 38 is assembled by first directing the desired number of fixing elements/bolts 46 through the openings 68, so that the heads 64 each key in a receptacle 60, and thereafter attaching the base assembly 42 to the side surface 40 on the containment wall 34. The bolt heads 64 thereby become captively held. This attachment of the base assembly 42 may be effected through the use of welds, shown at 98 and 100 in FIG. 3, or otherwise. The locking assembly 44 is then attached to the base assembly 42 by interengaging the C-shaped edges 64,78. This is accomplished by orienting the locking assembly 44 to the position shown in dotted lines in FIG. 4 so that a free edge 102 on the locking assembly 44 can be directed into a receptacle 104 defined by the edge 64 on the base assembly 42. Once this engagement is made, the locking assembly 44 can be guidingly pivoted downwardly, in the direction of the arrow 106 in FIG. 4 through the engaging edges 64, 102. The locking assembly 44 will thereby hang in pivoting fashion under its own weight.

Figure 2:
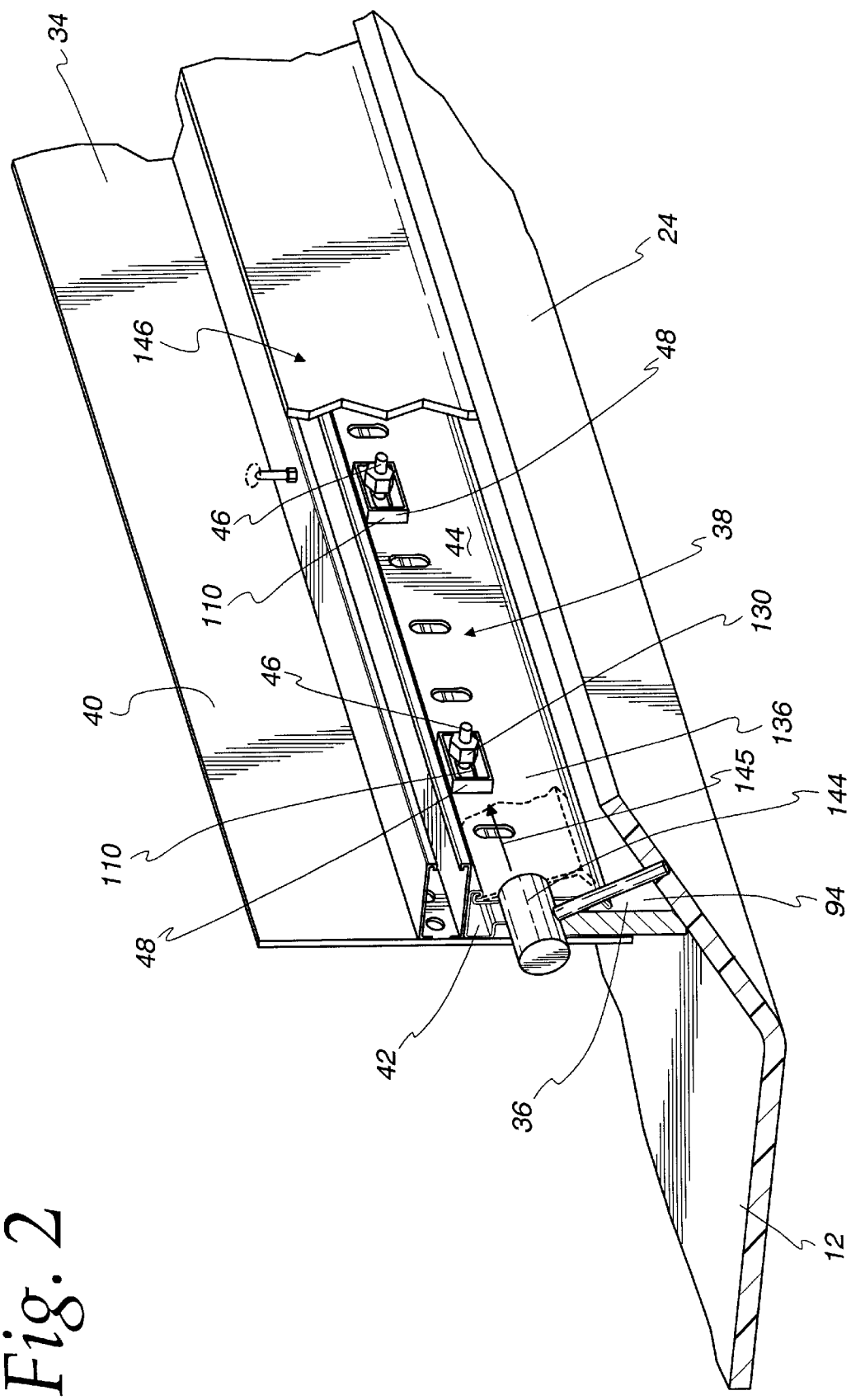
FIG. 2 is an enlarged, fragmentary, perspective view of one containment wall with the sealing element operatively held in place by the inventive clamping system.

The fixing elements/bolts 46 have a length sufficient to project through the locking assembly 44. With the heads 64 thereof blocked in the receptacle 60, the shanks 66 have a length sufficient to additionally pass through the wedge assemblies 48. The elongate configuration of the openings 96 in the locking assemblies 44 permits each locking assembly 44 to be pivoted during assembly about its upper end, without interference from the fixing elements 46, between a) a holding position, as shown in FIG. 2, wherein the edges 88,90 bear on the operatively mounted sealing element 36 and b) a range of mounting positions, including the position shown in phantom lines in FIG. 4, wherein the vertical position of the sealing element 36 can be adjusted, i.e. where little or no holding pressure is applied to the sealing element 36 by the edges 88,90.

Each wedge assembly 48, as seen clearly in FIGS. 1 and 8–12, consists of a body 110 having a generally rectangular perimeter wall 112. A camming wall 114 extends between end walls 116,118 and side walls 120,122 that cooperatively make up the perimeter wall 112. The body 110 has a base wall 124 from which the end walls 116,118 and side walls 120,122 extend in a substantially orthogonal direction. The camming wall 114 has a camming surface 126 extending at an angle α to the plane of the base wall 124. The camming surface 126 is actually concave to be complementary to a convex surface 128 on a nut 130 (FIG. 13) threaded to each shank 66 so as to define an enlargement at a location remote from the head 64 thereon. By providing a convex surface 128 on the nut 130, several different thicknesses of the sealing element 30,36 may be accommodated with a universal construction. An oval opening 132, that is elongate parallel to the length of the guide walls 120,122, receives the shank 66, and has a width "W", slightly larger than the diameter of the shank 66, so as to allow relative sliding movement in the direction of the double-headed arrow 134.

As seen in FIGS. 1 and 3, the bolt shanks 66 are directed through the wedge body openings 132 with the base wall 124 of the wedge body 110 bearing against the outwardly facing surface 136 of the locking assembly 44. With the shank 66 extended through the opening 132, the nut 130 can be threaded thereon. The nut 130 can be tightened with the shank 66 adjacent to the opening end 138.

The fixing elements 46 may be a standard one-half inch NC grade #8 304 stainless steel bolt. The nut 130 may be made from brass. The brass nut on the stainless steel bolt reduces the likelihood of corrosion. The wedge assembly 48 may be a cast aluminum part. The malleability between the brass nut 130 and cast aluminum wedge 48 provides a locking capability which generally reduces the likelihood of loosening through vibration.

Figure 10:
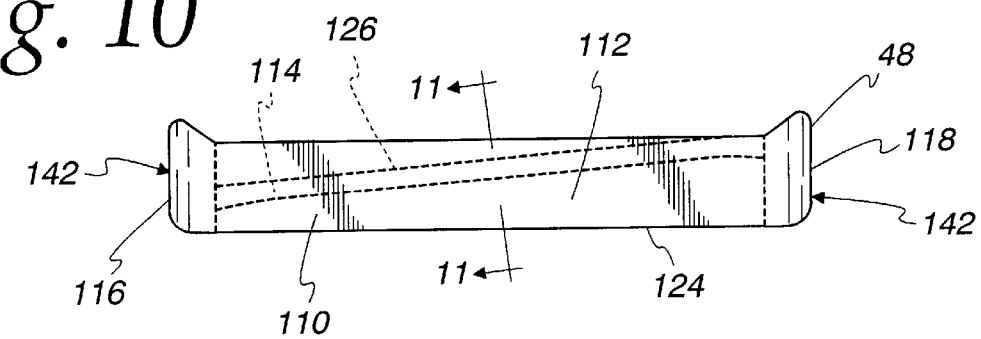
FIG. 10 is a side elevation view of the wedge assembly body of FIGS. 8 and 9.
Figure 11:
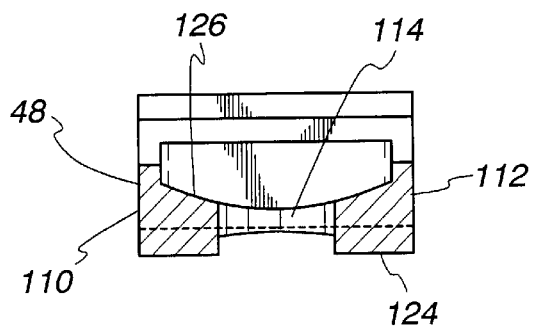
FIG. 11 is a cross-sectional view of the wedge assembly body taken along line 11—11 of FIG. 10.
Figure 12:
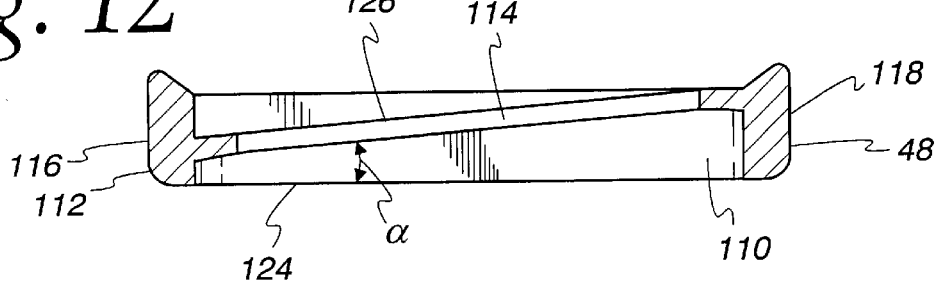
FIG. 12 is a cross-sectional view of the wedge assembly body taken along line 12—12 of FIG. 9.
Figure 13:
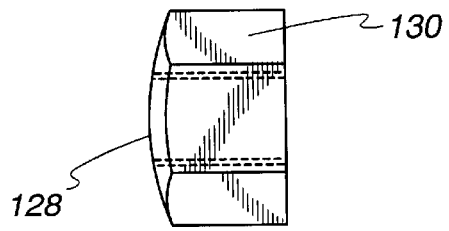
FIG. 13 is an enlarged, side elevation view of a nut attached to a fastener element to mount the wedge assembly bodies.

As can be seen in FIGS. 8, 10 and 12, the camming wall 114 is configured so that the camming surface 126 and base wall 124 cooperatively produce a wedge shape which increases in thickness from the end wall 116 toward the end wall 118. Preferably, the nut 130 is applied to the shank 66 in a first position at the opening end 138 with only a slight pressure that allows the sealing element 36 in the operative position to be shifted vertically relative to the locking assembly 44. By then repositioning the wedge assembly 48 relative to the shank 66 to a second position, wherein the shank 66 is advanced to the opposite opening end 140, the locking assembly 44 is thereby cammed by the wedge assembly 48 so that the bearing portion 80 of the locking assembly 44 is pressed positively into the holding position against the sealing element 36 in the operative position.

The angle α for the wall 114, as seen in FIG. 12, may be on the order of 4.8°, with the opening 132 permitting guided movement of the shank 66 lengthwise therealong a total distance on the order of 1.875 inches. Variations from this are, of course, contemplated and the design of the wedge assembly 48 may be dictated by its interaction with other elements on the clamping system 38.

Preferably, the wedge assemblies 48 are mounted to the shanks 66 so that they assume an orientation wherein the length of the wedge assembly 48 is substantially horizontal. With the shanks in the first position against the opening end 138 of the wedge assemblies 48, the sealing element 36 may be vertically shifted. By then translatingly moving the wedge assemblies 48 to the second position, wherein the shanks abut to the opening ends 140, the locking assembly 44 is forced into the holding position to positively maintain the sealing element 46 in the selected, vertical, operative position.

To facilitate translational movement of the wedge assemblies 48, the end walls 116,118 of the bodies 110 are formed with knurls 142. This facilitates movement by striking the end walls 116,118 with a weighted object, such as a hammer 144, which may be thrust, as in the direction of the arrow 145, against one of the end walls 116,118, as shown in FIG. 2. With this arrangement, the system operator can, with potentially a single blow of a hammer 144, strike the selected end wall 116,118 to change the wedge assembly 48 between the first and second positions.

The number of wedge assemblies 48 utilized may vary depending upon the application. While it is possible to mount wedge assemblies 48 at five inch intervals using the design shown, a system may utilize wedge assemblies 48 at only 20 inch intervals.

In a typical operation, the base assembly 42 is attached to the containment wall 34, whereafter the locking assembly 44 is operatively connected thereto, without the need for tools or separate fasteners. The attached locking assembly 44 can be allowed to hang under its own weight in a position wherein the shanks 66 project through the locking assembly 44 to allow placement of the wedge assemblies 48 and attachment of the nuts 130. The nuts 130 can be attached in two different manners. The bolt shanks 66 can be placed at the opening ends 140 and the nut 130 attached with a desired torque to produce a desired holding pressure by the locking assemblies 44 on the sealing element 36. Alternatively, the shanks 66 can be placed at the opening ends 138 and tightened to a pressure that is desired with the locking assembly in the mounting position which allows the sealing element 36 to be moved vertically. Regardless of how the set-up occurs, the installation is completed with the shank at or near the opening end 140.

When it is desired to vertically reposition the sealing element 36, the wedge assemblies 48 are shifted, as by striking the end walls 116 thereon, to allow the locking assemblies 44 to assume the mounting position. The sealing element 36 is then shifted downwardly, whereafter the opposite end walls 118 of the wedge assemblies 48 are struck to re-secure the locking assemblies 44 in the holding position.

As seen in FIGS. 1 and 3, an optional dust shield at 146 can then be attached to the containment wall 34 using a channel 148 and locking system as shown at 150. The locking system 150 includes a fastener 151 which is repositionable to selectively hold and release a cantilevered stud 152 on the shield 146.

While one exemplary embodiment is shown in the drawings, variations thereof are contemplated. As just one example, the fixing elements 46 can be attached directly to the containment walls 32,34 without the need for the base assembly 42. The locking assembly 144 can be mounted using the fixing elements without the need for the base assembly 42. This arrangement is not as convenient to utilize as manual holding of the locking assembly 44 may be required as the wedge assemblies 48 are installed.

The foregoing disclosure of specific embodiments is intended to be illustrative of the broad concepts comprehended by the invention.

What is claimed is:

1. In combination:
    a conveying surface that is movable to advance material supported thereon;
    a wall projecting upwardly from the conveying surface to confine material on the conveying surface;
    a sealing element to block passage of material between the conveying surface and wall; and
    a clamping system for the sealing element, said clamping system comprising:
    a) a locking assembly having a bearing portion that is mounted for movement relative to the wall between i) a mounting position and ii) a holding position, the sealing element residing between the wall and the bearing portion with the locking assembly in the holding position;
    b) a fixing element with a projecting shank on the wall; and
    c) a wedge assembly comprising a body that cooperates with the fixing element and is movable, slidably and guidingly relative to the locking assembly between first and second positions,
        said wedge assembly in the second position urging the bearing portion of the locking assembly toward the sealing element with a force that is greater than a force with which the wedge assembly urges the bearing portion of the locking assembly toward the sealing element with the wedge assembly in the first position,
        wherein with the locking assembly in the holding position, the projecting shank projects through the locking assembly and the wedge assembly.

2. The combination according to claim 1 wherein the body is movable translatingly in a line as the wedge assembly is changed between the first and second positions.

3. The combination according to claim 1 wherein the clamping system further comprises a base assembly that is attached to the wall and the locking assembly is attached to the base assembly.

4. The combination according to claim 3 wherein the locking assembly is pivotable against and relative to the base assembly for movement between the mounting and holding positions.

5. In combination:
    a conveying surface that is movable to advance material supported thereon;
    a wall projecting upwardly from the conveying surface to confine material on the conveying surface;
    a sealing element to block passage of material between the conveying surface and wall; and
    a clamping system for the sealing element, said clamping system comprising:

a) a locking assembly having a bearing portion that is mounted for movement relative to the wall between i) a mounting position and ii) a holding position, the sealing element residing between the wall and the bearing portion with the locking assembly in the holding position;
b) a fixing element on the wall; and
c) a wedge assembly comprising a body that cooperates with the fixing element and is movable, slidably and guidingly relative to the locking assembly between first and second positions,
said wedge assembly, in the second position urging the bearing portion of the locking assembly toward the sealing element with a force that is greater than a force with which the wedge assembly urges the bearing portion of the locking assembly toward the sealing element with the wedge assembly in the first position,
wherein the clamping system further comprises a base assembly that is attached to the wall and the locking assembly is attached to the base assembly,
wherein the locking assembly is pivotable relative to the base assembly for movement between the mounting and holding positions,
wherein the locking assembly and base assembly each have a C-shaped edge and the C-shaped edges interengage to guide pivoting movement between the locking assembly and the base assembly.

6. The combination according to claim 5 wherein the C-shaped edges are engageable and disengageable by relatively moving the locking assembly and base assembly.

7. In combination:
a conveying surface that is movable to advance material supported thereon;
a wall projecting upwardly from the conveying surface to confine material on the conveying surface;
a sealing element to block passage of material between the conveying surface and wall; and
a clamping system for the sealing element, said clamping system comprising:
a) a locking assembly having a bearing portion that is mounted for movement relative to the wall between i) a mounting position and ii) a holding position, the sealing element residing between the wall and the bearing portion with the locking assembly in the holding position;
b) a fixing element on the wall; and
c) a wedge assembly comprising a body that cooperates with the fixing element and is movable, slidably and guidingly relative to the locking assembly between first and second positions,
said wedge assembly in the second position urging the bearing portion of the locking assembly toward the sealing element with a force that is greater than a force with which the wedge assembly urges the bearing portion of the locking assembly toward the sealing element with the wedge assembly in the first position,
wherein the clamping system further comprises a base assembly that is attached to the wall and the locking assembly is attached to the base assembly,
wherein the fixing element comprises a bolt with a head, and the bolt head is captively held against the wall by the base assembly.

8. The combination according to claim 1 wherein the bearing portion of the locking assembly comprises a V-shaped element with free edges which simultaneously bear against the sealing element with the locking assembly in the holding position.

9. In combination:
a conveying surface that is movable to advance material supported thereon;
a wall projecting upwardly from the conveying surface to confine material on the conveying surface;
a sealing element to block passage of material between the conveying surface and wall; and
a clamping system for the sealing element, said clamping system comprising:
a) a locking assembly having a bearing portion that is mounted for movement relative to the wall between i) a mounting position and ii) a holding position, the sealing element residing between the wall and the bearing portion with the locking assembly in the holding position;
b) a fixing element on the wall; and
c) a wedge assembly comprising a body that cooperates with the fixing element and is movable, slidably and guidingly relative to the locking assembly between first and second positions,
said wedge assembly in the second position urging the bearing portion of the locking assembly toward the sealing element with a force that is greater than a force with which the wedge assembly urges the bearing portion of the locking assembly toward the sealing element with the wedge assembly in the first position,
wherein the body of the wedge assembly comprises an elongate slot through which the fixing element extends and a cam surface and the fixing element comprise a shank which extends through the elongate slot and an enlargement on the shank which is guided against the cam surface as the wedge assembly is changed between the first and second positions.

10. The combination according to claim 9 wherein the shank is threaded and the enlargement is defined by a nut which is threaded to the shank.

11. The combination according to claim 10 wherein the nut has a convex surface which is guided against the cam surface.

12. The combination according to claim 3 wherein the sealing element is clamped directly between a part of the base assembly and the bearing portion of the locking assembly.

13. The combination according to claim 1 wherein the locking assembly comprises a formed metal sheet.

14. The combination according to claim 3 wherein the base assembly comprises a formed metal sheet.

15. The combination according to claim 1 wherein the body is movable directly against and relative to the locking assembly.

16. A clamping system for a sealing element to be situated between a movable conveying surface and a wall projecting upwardly from the conveying surface to confine material on the conveying surface, said clamping system comprising:
a base assembly for attachment to the wall;
a locking assembly having a bearing portion that is mounted to the base assembly for movement relative to the base assembly between a) a mounting position and b) a holding position,
the bearing portion in the holding position acting against the sealing element to maintain the sealing element in an operative position on the wall;

a fixing element for attachment to the wall and having a threaded shank;

a wedge assembly comprising a body that cooperates with the fixing element and is movable slidably and guidingly relative to the locking assembly between first and second positions; and a nut attached to the threaded shank so that the wedge assembly body is in a captive relationship between the nut and the locking assembly, the wedge assembly in the second position urging the bearing portion of the locking assembly toward the sealing element with a force that is greater than a force with which the wedge assembly urges the bearing portion of the locking assembly toward the sealing element with the wedge assembly in the first position.

17. The clamping system according to claim 16 wherein the body is movable translatingly in a line as the wedge assembly is changed between the first and second positions.

18. The clamping system according to claim 16 wherein the locking assembly is pivotable relative to the base assembly for movement between the mounting and holding positions.

19. A clamping system for a sealing element to be situated between a movable conveying surface and a wall projecting upwardly from the conveying surface to confine material on the conveying surface, said clamping system comprising:

a base assembly for attachment to the wall;

a locking assembly having a bearing portion that is mounted to the base assembly for movement relative to the base assembly between a) a mounting position and b) a holding position, the bearing portion in the holding position acting against the sealing element to maintain the sealing element in an operative position on the wall;

a fixing element for attachment to the wall; and a wedge assembly comprising a body that cooperates with the fixing element and is movable slidably and guidingly relative to the locking assembly between first and second positions, the wedge assembly in the second position urging the bearing portion of the locking assembly toward the sealing element with a force that is greater than a force with which the wedge assembly urges the bearing portion of the locking assembly toward the sealing element with the wedge assembly in the first position, wherein the locking assembly is pivotable relative to the base assembly for movement between the mounting and holding positions, wherein the locking assembly and base assembly each have a C-shaped edge and the C-shaped edges interengage to guide pivoting movement between the locking assembly and the base assembly.

20. The clamping system according to claim 19 wherein the C-shaped edges are engageable and disengageable by relatively moving the locking assembly and base assembly.

21. A clamping system for a sealing element to be situated between a movable conveying surface and a wall projecting upwardly from the conveying surface to confine material on the conveying surface, said clamping system comprising:

a base assembly for attachment to the wall;

a locking assembly having a bearing portion that is mounted to the base assembly for movement relative to the base assembly between a) a mounting position and b) a holding position, the bearing portion in the holding position acting against the sealing element to maintain the sealing element in an operative position on the wall;

a fixing element for attachment to the wall; and a wedge assembly comprising a body that cooperates with the fixing element and is movable slidably and guidingly relative to the locking assembly between first and second positions, the wedge assembly in the second position urging the bearing portion of the locking assembly toward the sealing element with a force that is greater than a force with which the wedge assembly urges the bearing portion of the locking assembly toward the sealing element with the wedge assembly in the first position, wherein the fixing element comprises a bolt with a head, and the bolt head an be captively held against the wall by the base assembly.

22. The clamping system according to claim 16 wherein the bearing portion of the locking assembly comprises a V-shaped element with free edges which simultaneously bear against the sealing element with the locking assembly in the holding position.

23. A clamping system for a sealing element to be situated between a movable conveying surface and a wall projecting upwardly from the conveying surface to confine material on the conveying surface, said clamping system comprising:

a base assembly for attachment to the wall;

a locking assembly having a bearing portion that is mounted to the base assembly for movement relative to the base assembly between a) a mounting position and b) a holding position, the bearing portion in the holding position acting against the sealing element to maintain the sealing element in an operative position on the wall;

a fixing element for attachment to the wall; and a wedge assembly comprising a body that cooperates with the fixing element and is movable slidably and guidingly relative to the locking assembly between first and second positions, the wedge assembly in the second position urging the bearing portion of the locking assembly toward the sealing element with a force that is greater than a force with which the wedge assembly urges the bearing portion of the locking assembly toward the sealing element with the wedge assembly in the first position, wherein the body of the wedge assembly comprises an elongate slot through which the fixing element extends and a cam surface and the fixing element comprises a shank which extends through the elongate slot and an enlargement on the shank which is guided against the cam surface as the wedge assembly is changed between the first and second positions.

24. The clamping system according to claim 23 wherein the shank is threaded and the enlargement comprises a nut which is threaded to the shank.

25. The clamping system according to claim 24 wherein the nut has a convex surface which is guided against the cam surface.

26. The clamping system according to claim 16 wherein the sealing element can be clamped directly between a part of the base assembly and the bearing portion of the locking assembly.

27. The clamping system according to claim 16 wherein the locking assembly comprises a formed metal sheet.

28. The clamping system according to claim 16 wherein the base assembly comprises a formed metal sheet.

29. The clamping system according to claim 16 wherein the body is movable directly against and relative to the locking assembly.

30. A method of mounting a sealing element in an operative position on a conveyor system comprising a conveying surface that is movable to advance material supported thereon and a wall projecting upwardly from the conveying surface to confine material on the conveying surface, so as to block passage of material between the conveying surface and the wall, said method comprising the steps of:

attaching a locking assembly to the wall for movement relative to the wall between a mounting position and a holding position by hanging the locking assembly under its own weight at a pivot location about which the locking assembly is pivotable guidingly between the mounting and holding positions, a part of the locking assembly being closer to the sealing element with the locking assembly in the mounting position than with the locking assembly in the holding position;

connecting a body to a fixing element on the wall; and sliding the body guidingly relative to the fixing element from a first position into a second position and thereby camming a portion of the locking assembly against the sealing element with the sealing element in the operative position.

31. A method of mounting a sealing element in an operative position on a conveyor system comprising a conveying surface that is movable to advance material supported thereon and a wall projecting upwardly from the conveying surface to confine material on the conveying surface, so as to block passage of material between the conveying surface and the wall, said method comprising the steps of:

attaching a locking assembly to the wall for movement relative to the wall between a mounting position and a holding position;

connecting a body to a fixing element on the wall; and sliding the body guidingly relative to the fixing element from a first position into a second position and thereby camming a portion of the locking assembly against the sealing element with the sealing element in the operative position, wherein the fixing element comprises a shank and an enlargement on the shank and the body moves guidingly against the enlargement on the shank as the body is moved from the first position into the second position.

32. The method of mounting a sealing element according to claim 30 wherein the body moves in a substantially straight line between the first and second positions.

33. The method of mounting a sealing element according to claim 30 further comprising the step of moving the body from the second position into the first position and thereafter repositioning the sealing element relative to the wall and moving the body from the first position into the second position.

34. The method of mounting a sealing element according to claim 30 wherein the step of sliding the body comprises moving the body by striking the body with an object.

35. The method of mounting a sealing element according to claim 30 wherein the step of sliding the body comprises moving the body by striking the body with a hammer.

36. The method of mounting a sealing element according to claim 30 further comprising the step of attaching a base assembly to the wall and the step of attaching the locking assembly to the wall comprises attaching the locking assembly to the base assembly.

37. The method of mounting a sealing element according to claim 36 wherein the step of attaching the locking assembly to the base assembly comprises engaging the locking assembly to the base assembly for pivoting movement of the locking assembly relative to the base assembly.

38. A method of mounting a sealing element in an operative position on a conveyor system comprising a conveying surface that is movable to advance material supported thereon and a wall projecting upwardly from the conveying surface to confine material on the conveying surface, so as to block passage of material between the conveying surface and the wall, said method comprising the steps of:

attaching a locking assembly to the wall for movement relative to the wall between a mounting position and a holding position;

connecting a body to a fixing element on the wall;

sliding the body guidingly relative to the fixing element from a first position into a second position and thereby camming a portion of the locking assembly against the sealing element with the sealing element in the operative position, attaching a base assembly to the wall, wherein the step of attaching the locking assembly to the wall comprises attaching the locking assembly to the base assembly, wherein the step of attaching the locking assembly to the base assembly comprises interengaging C-shaped edges on the locking assembly and base assembly.

39. The method of mounting a sealing element according to claim 36 further comprising the step of captively holding the fixing element relative to the wall through the base assembly.

* * * * *

UNITED STATES PATENT AND TRADEMARK OFFICE
Certificate

Patent No. 6,547,062 B2                                    Patented: April 15, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Daniel Wiggins, Marquette, MI (US); Robert J. Airaudi, Isheming, MI (US); and Alan J. Henderson, Marquette, MI (US).

Signed and Sealed this Eighth Day of August 2006.

*GENE O. CRAWFORD*
*Supervisory Patent Examiner*
*Art Unit 3651*